(12) United States Patent
Peng et al.

(10) Patent No.: US 12,309,336 B2
(45) Date of Patent: May 20, 2025

(54) FIXATION HEATING CIRCUIT AND IMAGE FORMING DEVICE

(71) Applicant: Zhuhai Pantum Electronics Co., Ltd., Zhuhai (CN)

(72) Inventors: Xing Peng, Zhuhai (CN); Zhaoxing Miao, Zhuhai (CN)

(73) Assignee: ZHUHAI PANTUM ELECTRONICS CO., LTD., Zhuhai (CN)

( * ) Notice: Subject to any disclaimer, the term of this patent is extended or adjusted under 35 U.S.C. 154(b) by 0 days.

(21) Appl. No.: 18/173,057

(22) Filed: Feb. 22, 2023

(65) Prior Publication Data
US 2023/0276012 A1 Aug. 31, 2023

(30) Foreign Application Priority Data

Feb. 25, 2022 (CN) .......................... 202220408047.1

(51) Int. Cl.
G03G 15/20 (2006.01)
G03G 15/00 (2006.01)
H04N 1/23 (2006.01)

(52) U.S. Cl.
CPC ....... *H04N 1/2346* (2013.01); *G03G 15/2039* (2013.01); *G03G 15/5004* (2013.01)

(58) Field of Classification Search
CPC .......................... H04N 1/2346; G03G 15/5004
See application file for complete search history.

(56) References Cited

U.S. PATENT DOCUMENTS 7,266,314 B2 * 9/2007 Takami .............. G03G 15/2039
399/33

* cited by examiner

*Primary Examiner* — Arlene Heredia
(74) *Attorney, Agent, or Firm* — ANOVA LAW GROUP PLLC (57) ABSTRACT

A fixation heating circuit includes a mains power interface; a switch circuit, a heater, and a temperature detection circuit that are connected to each other to form a heating loop. The fixation heating circuit further includes a switch control circuit; a thermistor reception terminal; and a thermistor insertion terminal. The thermistor insertion terminal includes first to fourth insertion terminals, a thermistor being connected between the first and second insertion terminals, and the third and fourth insertion terminals being connected via a wire. The thermistor reception terminal includes first to fourth reception terminals corresponding to the first to fourth insertion terminals, the first and second reception terminals being arranged in the temperature detection circuit. The temperature detection circuit is connected to the switch control circuit that is connected to the third reception terminal. The switch circuit is connected to the fourth reception terminal.

20 Claims, 7 Drawing Sheets

FIXATION HEATING CIRCUIT AND IMAGE FORMING DEVICE

CROSS-REFERENCE TO RELATED APPLICATION

This application claims the priority to Chinese patent application No. 202220408047.1, filed on Feb. 25, 2022, the entirety of which is incorporated herein by reference.

TECHNICAL FIELD

The present disclosure relates to the technical field of imaging and, more particularly, to a fixation heating circuit and an image forming device.

BACKGROUND

A fixation heating circuit is usually involved in an image forming device including, but not limited to a printer, a copier, a fax machine, a scanner, and an all-in-one machine that integrates all these functions for printing images or text on imaging media. The fixation heating circuit can be used to heat a fixation roller in the image forming device.

In the image forming device, an over-temperature protection mechanism is usually designed, so that the fixation heating circuit can be turned off once it is detected that temperature is too high. A thermistor is an important electronic element to implement the over-temperature protection mechanism.

It is found through research that, in existing technologies, the thermistor can be inserted into the image forming device for convenience of operation and maintenance. When the thermistor is missed, it causes the over-temperature protection mechanism to be unable to be implemented normally, and even causes a safety accident in severe cases. So a thermistor missing detection circuit must also be specially set up in a circuit design for existing image forming devices. Therefore, there is a problem of high circuit design cost in the existing technologies, and sometimes the thermistor missing detection circuit also has a problem of inaccurate detection.

SUMMARY

In accordance with the present disclosure, there is provided a fixation heating circuit. The fixation heating circuit includes a mains power interface; a switch circuit; a heater; a temperature detection circuit; a switch control circuit; a thermistor reception terminal; and a thermistor insertion terminal. The mains power interface, the switch circuit, and the heater are connected to each other to form a heating loop. The thermistor insertion terminal includes first to fourth insertion terminals, a thermistor being connected between the first insertion terminal and the second insertion terminal, and the third insertion terminal and the fourth insertion terminal being connected via a wire. The thermistor reception terminal includes first to fourth reception terminals corresponding to the first to fourth insertion terminals, the first reception terminal and the second reception terminal being arranged in the temperature detection circuit. The temperature detection circuit is connected to the switch control circuit, the switch control circuit being connected to the third reception terminal, and the switch circuit being connected to the fourth reception terminal.

Also in accordance with the disclosure, there is provided an image forming device. The image forming device includes a fixation heating circuit. The fixation heating circuit includes a mains power interface; a switch circuit; a heater; a temperature detection circuit; a switch control circuit; a thermistor reception terminal; and a thermistor insertion terminal. The mains power interface, the switch circuit, and the heater are connected to each other to form a heating loop. The thermistor insertion terminal includes first to fourth insertion terminals, a thermistor being connected between the first insertion terminal and the second insertion terminal, and the third insertion terminal and the fourth insertion terminal being connected via a wire. The thermistor reception terminal includes first to fourth reception terminals corresponding to the first to fourth insertion terminals, the first reception terminal and the second reception terminal being arranged in the temperature detection circuit. The temperature detection circuit is connected to the switch control circuit, the switch control circuit being connected to the third reception terminal, and the switch circuit being connected to the fourth reception terminal.

BRIEF DESCRIPTION OF THE DRAWINGS

In order to explain the technical solutions in the embodiments of the present disclosure more clearly, reference is made to the accompanying drawings, which are used in the description of the embodiments. Obviously, the drawings in the following description are only some embodiments of the present disclosure, and other drawings can be obtained from these drawings without any inventive effort for those of ordinary skill in the art.

DETAILED DESCRIPTION OF THE EMBODIMENTS

In order to better understand the technical solutions of the present disclosure, the embodiments of the present disclosure are described in detail with reference to the accompanying drawings.

Obviously, the described embodiments are only some of rather than all the embodiments of the present disclosure. Based on the described embodiments, all other embodiments obtained by those of ordinary skill in the art without inventive effort shall fall within the scope of the present disclosure.

As described herein, terms used in the embodiments of the present disclosure are intended to describe example embodiments, instead of limiting the present disclosure. The singular forms "a," "an," and "the" used in the embodiments of the present disclosure and the appended claims are intended to include plural forms as well, unless the context clearly indicates otherwise.

It should be understood that the term "and/or" used in this specification is just for relationship description of related objects, indicating that there can be three kinds of relationships. For example, A and/or B, which can mean that A exists alone, A and B exist at the same time, and B exists alone. In addition, the character "/" in this specification generally indicates that the related objects are in an "or" relationship.

Figure 1:
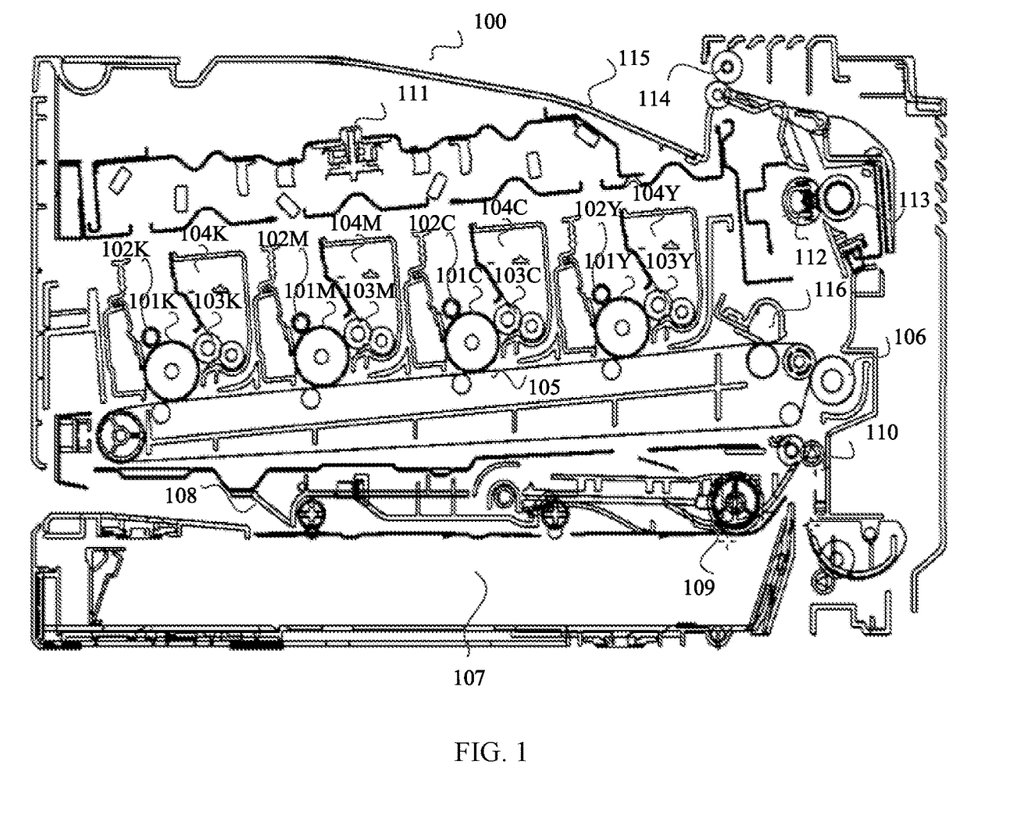
FIG. 1 is a schematic structural diagram of an image forming device according to an embodiment of the present disclosure.

FIG. 1 shows an image forming device provided in the embodiments of the present disclosure. The image forming device consistent with the present disclosure includes but is not limited to a printer, a copier, a fax machine, a scanner, and an all-in-one machine that integrates functions such as printing, copying, faxing, and scanning, etc., and the function is to print images or text on imaging media.

In the embodiments of the present disclosure, an image forming device 100 includes four process cartridges (Y, C, M, K), a transfer belt 105, a secondary transfer roller 106, an input paper cartridge 107, a manual paper feed tray 108, a paper feed roller 109, a conveying roller 110, a laser scanning unit (LSU) 111, a heat roller 112, a pressure roller 113, a discharge roller 114, and a discharge paper cartridge 115, etc. The four process cartridges (Y, C, M, K) store toners of four printing colors respectively, and specific structures respectively include photosensitive drums 101Y-K, charging rollers 102Y-K, development rollers 103Y-K, and toner cartridges 104Y-K for holding the toners of respective colors. The LSU 111 shown in FIG. 1 is in a form of a single LSU including four beam paths. The four charging rollers 102Y-K are configured to charge surfaces of the four photosensitive drums 101Y-K respectively, and the four beam paths of the LSU 111 respectively emit laser beams to form electrostatic latent images on the surfaces of the photosensitive drums 101Y-K. The four development rollers 103Y-K are configured to develop toner images of respective colors on the surfaces of the photosensitive drums 101Y-K, respectively. The image forming device 100 uses a secondary transfer method, in which the four photosensitive drums 101Y-K sequentially transfer the toner images to the transfer belt 105, and then the color toner images formed on the transfer belt 105 are secondarily transferred to paper through the secondary transfer roller 106. The input paper cartridge 107 stores paper, and the paper feed roller 109 conveys the stored paper to a conveying path. The conveying roller 110 conveys the paper on the conveying path to the secondary transfer roller 106 for transfer image formation. The secondary transfer roller 106 conveys the imaged paper to a nip area between the heat roller 112 and the pressure roller 113. The heat roller 112 and the pressure roller 113 are configured to fix the toner images on the paper, and convey the fixed paper to the discharge roller 114. The discharge roller 114 discharges the paper to the discharge paper cartridge 115 and the paper are stacked, thereby image printing is completed. Yellow is Y, cyan is C, magenta is M, and black is K, and the four process cartridges (Y, C, M, K) store toners of yellow, cyan, magenta, and black, respectively.

In the embodiments of the present disclosure, the image forming device 100 needs to have a fixation heating circuit to heat the heat roller 112, and a heating method may be, but not limited to, a ceramic heating method.

In existing technologies, the image forming device 100 is usually designed with an over-temperature protection mechanism. Generally, a thermistor is inserted into a temperature detection circuit. Once it is detected that temperature exceeds a set value, the fixation heating circuit is turned off, and heating of the heat roller 112 is stopped. It is usually needed to design a thermistor missing detection circuit, and cost is relatively high. Therefore, the fixation heating circuit is improved in the embodiments of the present disclosure.

Figure 2:
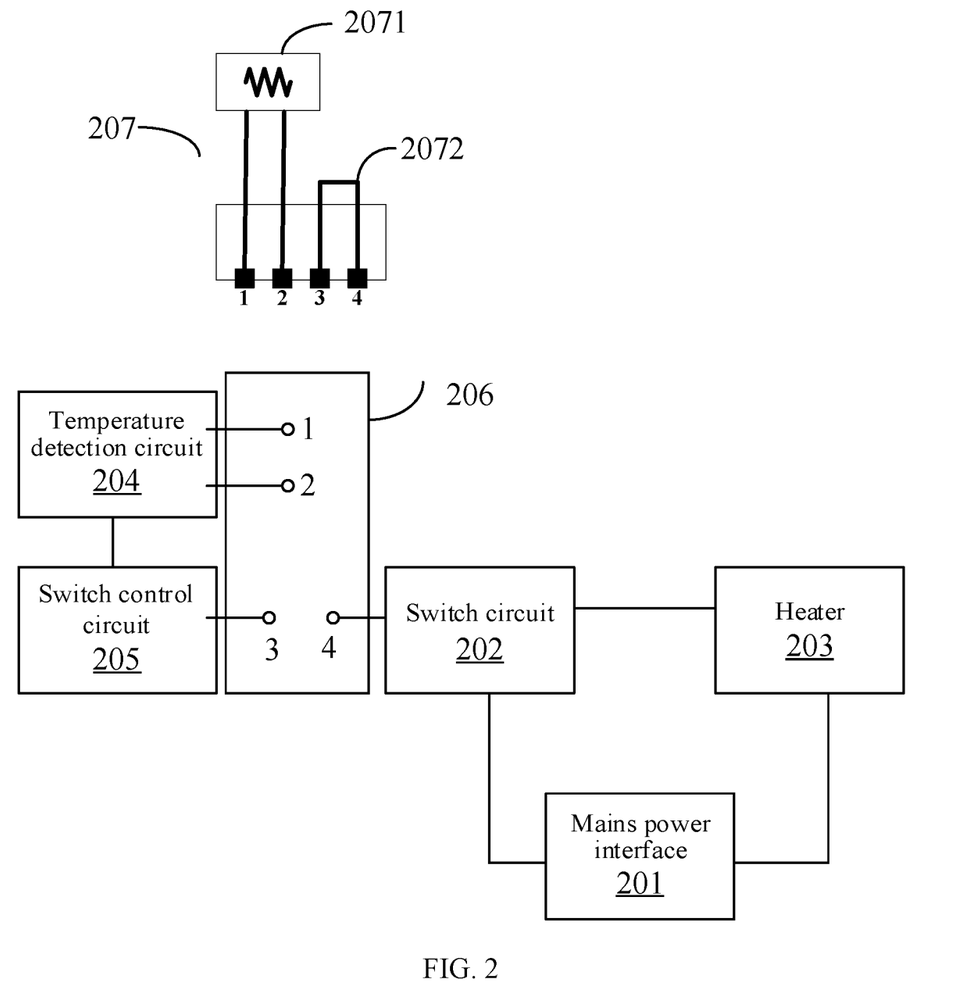
FIG. 2 is a schematic structural diagram of a fixation heating circuit according to an embodiment of the present disclosure.

FIG. 2 shows a fixation heating circuit provided in the embodiments of the present disclosure.

In the embodiments of the present disclosure, the fixation heating circuit includes a mains power interface 201, a switch circuit 202, a heater 203, a temperature detection circuit 204, a switch control circuit 205, a thermistor reception terminal 206, and a thermistor insertion terminal 207.

The mains power interface 201, the switch circuit 202, and the heater 203 are connected to each other to form a heating loop.

The thermistor insertion terminal 207 includes first to fourth insertion terminals, where a thermistor 2071 is connected between the first insertion terminal and the second insertion terminal, and the third insertion terminal and the fourth insertion terminal are connected via a wire 2072.

The thermistor reception terminal 206 includes first to fourth reception terminals corresponding to the first to fourth insertion terminals, and the first reception terminal and the second reception terminal are arranged in the temperature detection circuit 204.

The temperature detection circuit 204 is connected to the switch control circuit 205. The switch control circuit 205 is connected to the third reception terminal, and the switch circuit 202 is connected to the fourth reception terminal.

Principle of the fixation heating circuit in the embodiments of the present disclosure is described in detail below.

In the fixation heating circuit in the embodiments of the present disclosure, the mains power interface 201, the switch circuit 202, the heater 203, the temperature detection circuit 204, the switch control circuit 205, and the thermistor reception terminal 206 are arranged at one end of a body of the image forming device (including being arranged at an inner or outer surface of the body, etc.). The thermistor insertion terminal 207 may be separated from the body of the image forming device, or may be inserted into the thermistor reception terminal 206.

The mains power interface 201, the switch circuit 202, and the heater 203 are connected to each other to form the heating loop. The mains power interface 201 can be connected to a mains AC power supply (such as a 220V AC power supply), and the mains power interface 201 can be, but is not limited to, a three-phase AC power plug. The switch circuit 202 can be turned on or off under control of the switch control circuit 205 (provided that the thermistor is connected to make the temperature detection circuit work normally, and the third reception terminal and the fourth reception terminal are connected), so that the heater 203 can heat the heat roller. The switch circuit 202 may be a switch circuit in various forms, for example, a semiconductor switch such as a switch tube or an optocoupler, and may also be a device such as a relay.

The temperature detection circuit 204 can be, but is not limited to, a voltage divider circuit. When the thermistor 2071 is inserted between the first reception terminal and the second reception terminal, the thermistor 2071 becomes a part of the voltage divider circuit, so that the temperature detection circuit 204 can detect a temperature detection signal (such as a detected divided voltage value), and send the temperature detection signal to the switch control circuit 205. When the thermistor 2071 is not inserted between the first reception terminal and the second reception terminal, the temperature detection circuit 204 is disconnected and is in an invalid state, so that a valid temperature detection signal cannot be sent to the switch control circuit 205.

The switch control circuit 205 can include various control chips, such as a microcontroller unit (MCU), a central processing unit (CPU), a field-programmable gate array (FPGA), etc., which can perform analog-to-digital conversion on the temperature detection signal, obtain a temperature value corresponding to a voltage signal, and further control the switch circuit 202 to be on or off (in a software control mode) according to the temperature value. When the thermistor insertion terminal 207 is inserted into the thermistor reception terminal 206, the third reception terminal and the fourth reception terminal are connected, and the switch control circuit 205 can effectively control the switch circuit 202. When the thermistor insertion terminal 207 is separated from the thermistor reception terminal 206, the switch control circuit 205 is disconnected from the switch circuit 202, and cannot effectively control the switch circuit 202, so that the switch circuit 202 is in an invalid disconnected state, and the heating loop cannot work.

In the embodiments of the present disclosure, the thermistor insertion terminal 207 may be, but not limited to, a four-terminal plug, and the thermistor reception terminal 206 is a four-terminal socket correspondingly.

In the embodiments of the present disclosure, the fixation heating circuit includes the mains power interface, the switch circuit, the heater, the temperature detection circuit, the switch control circuit, the thermistor reception terminal, and the thermistor insertion terminal. The mains power interface, the switch circuit, and the heater are connected to each other to form the heating loop. The thermistor insertion terminal includes first to fourth insertion terminals, where the thermistor is connected between the first insertion terminal and the second insertion terminal, and the third insertion terminal and the fourth insertion terminal are connected via the wire. The thermistor reception terminal includes first to fourth reception terminals, and the first reception terminal and the second reception terminal are arranged in the temperature detection circuit. The temperature detection circuit is connected to the switch control circuit. The switch control circuit is connected to the third reception terminal, and the switch circuit is connected to the fourth reception terminal. In this way, when the thermistor insertion terminal is inserted into the thermistor reception terminal, the thermistor is connected to the temperature detection circuit, and the switch control circuit and the switch circuit are electrically connected, so that the temperature detection circuit can realize normal temperature detection function. The switch control circuit can also realize control function of the switch circuit to be on or off, so as to realize connection or disconnection of the heating loop. When the thermistor insertion terminal is separated from the thermistor reception terminal, there is no thermistor in the temperature detection circuit, so that temperature detection cannot be performed. Also, the switch control circuit and the switch circuit are disconnected, and the switch circuit is off, so that the heating loop cannot work normally. Therefore, compared with the existing technologies, in the technical solution of the present disclosure, it is not needed to set up the thermistor missing detection circuit, which reduces the cost. Also, when the thermistor is missed, the heating loop cannot work, so that safety of electricity consumption can be ensured, and accuracy of detecting whether the thermistor is missed or not is enhanced.

Figure 3A:
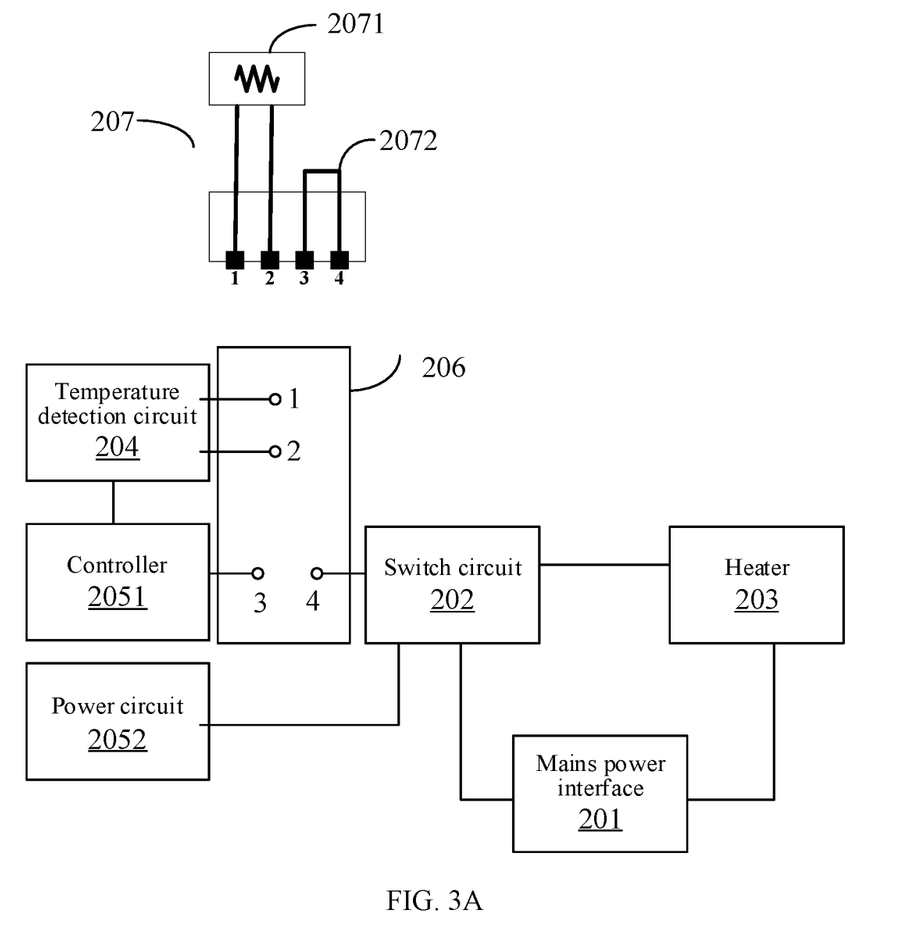
FIGS. 3A and 3B are schematic structural diagrams of two fixation heating circuits according to another embodiment of the present disclosure.
Figure 3B:
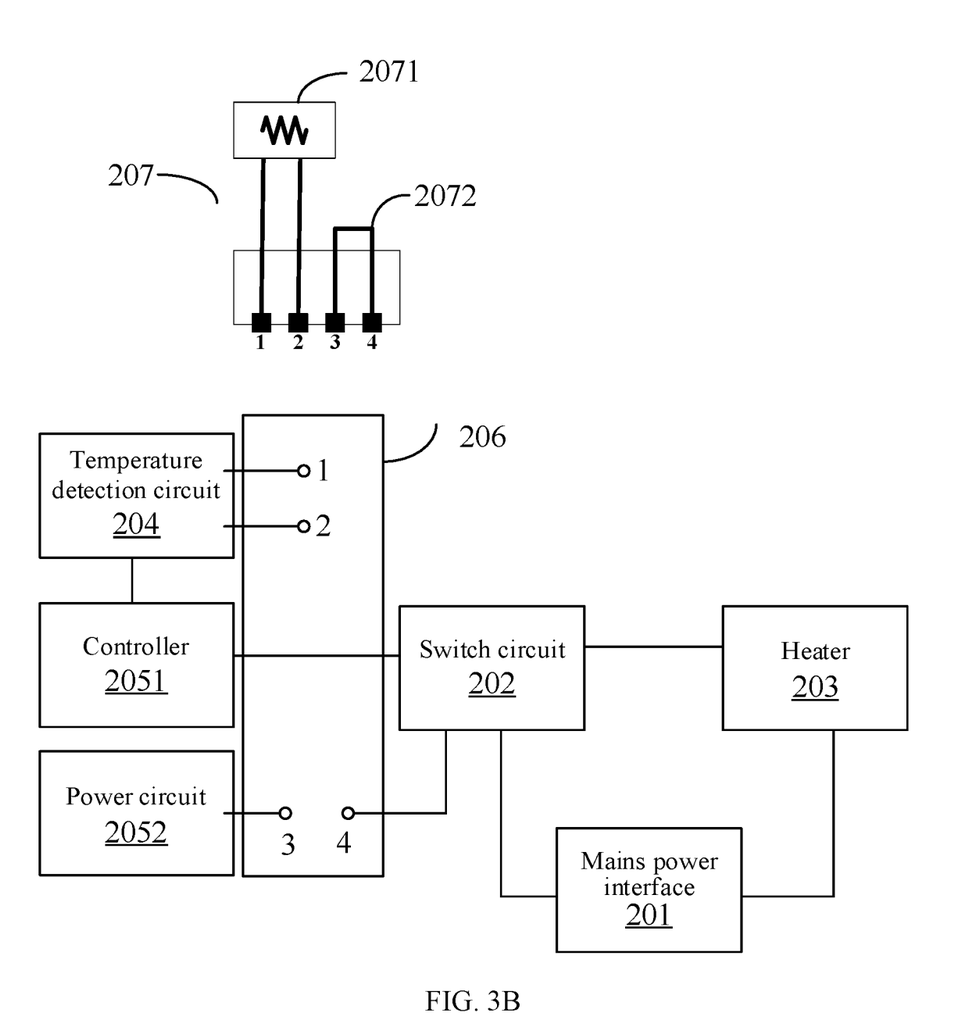

FIGS. 3A and 3B show two fixation heating circuits provided in the embodiments of the present disclosure.

Compared with FIG. 2, the mains power interface 201, the switch circuit 202, and the heater 203 in the embodiments of FIGS. 3A and 3B form the heating loop, and structures and principles of the thermistor insertion terminal 207 and the temperature detection circuit 204 are similar, which will not be described in detail herein.

On the basis of FIG. 2, in the embodiments of FIGS. 3A and 3B, the switch control circuit includes a controller 2051 and a power circuit 2052 for supplying power to the switch circuit 202.

Both the controller 2051 and the power circuit 2052 can control the valid state of the switch circuit 202. For example, the controller 2051 can output a control signal to the switch circuit 202, so that the switch circuit 202 can be controlled to be on or off. The power circuit 2052 is configured to supply power (such as +12V, +24V DC power, etc.) to the switch circuit 202. It is easy to understand that the switch circuit 202 can work effectively only when the power circuit 2052 is connected to the switch circuit 202, otherwise the switch circuit 202 is in an invalid disconnected state when power supply is not connected, and the heating loop cannot work normally.

Further, the thermistor reception terminal 206 can include two setup modes.

One mode is shown in FIG. 3A, in which the first reception terminal and the second reception terminal are set in the temperature detection circuit 204, the third reception terminal is connected to the controller 2051, the fourth reception terminal is connected to the switch circuit 202, and the power circuit 2052 is connected to the switch circuit 202. In this mode, although the power circuit 2052 can supply power to the switch circuit 202, the temperature detection circuit 204 is in an invalid state when the thermistor insertion terminal 207 is not inserted into the thermistor reception terminal 206, so that the controller 2051 cannot control the switch circuit 202, and the switch circuit 202 will be turned off. The temperature detection circuit 204 is effective only when the thermistor insertion terminal 207 is inserted into the thermistor reception terminal 206, and then the controller 2051 can effectively control the switch circuit 202, thereby implementing the over-temperature protection mechanism of the image forming device.

Another mode is shown in FIG. 3B, in which the first reception terminal and the second reception terminal are set in the temperature detection circuit 204, the third reception terminal is connected to the power circuit 2052, the fourth reception terminal is connected to the switch circuit 202, and the controller 2051 is always connected to the switch circuit 202. In this mode, similarly, the power circuit 2052 can supply power to the switch circuit 202 only when the thermistor insertion terminal 207 is inserted into the thermistor reception terminal 206, and then the controller 2051 can effectively control the switch circuit 202, thereby implementing the over-temperature protection mechanism of the image forming device.

Figure 4:
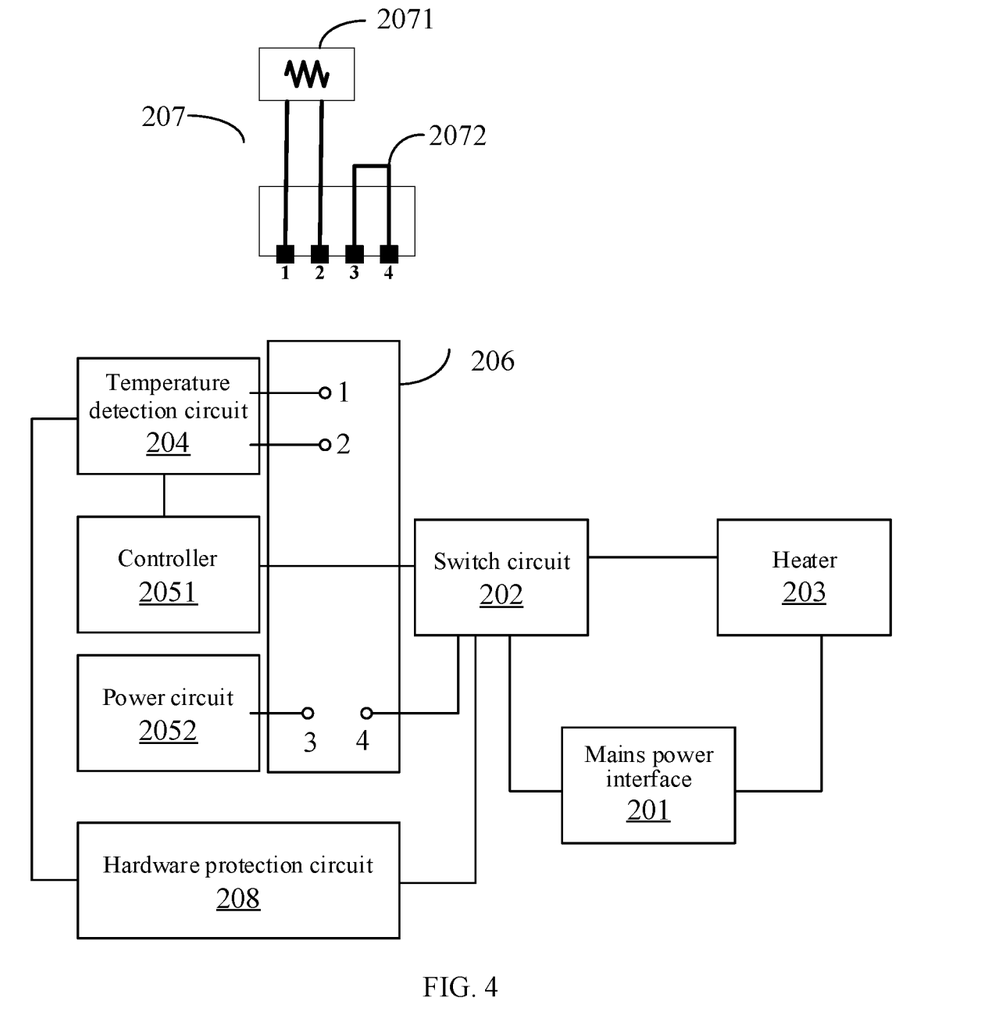
FIG. 4 is a schematic structural diagram of a fixation heating circuit according to another embodiment of the present disclosure.

FIG. 4 shows another fixation heating circuit provided in the embodiments of the present disclosure.

In the embodiments of the present disclosure, the fixation heating circuit further includes a hardware protection circuit 208, which is connected to the temperature detection circuit 204 and the switch circuit 202.

The hardware protection circuit 208 in the embodiments of the present disclosure is configured to further provide a protection mechanism for the image forming device. Since the controller 2051 may be in an invalid software control state due to an external reason such as abnormal program or lightning, the switch circuit 202 cannot be normally controlled to be on or off. In this case, the hardware protection circuit 208 can effectively control the switch circuit to turn off after receiving a voltage detection signal set by the temperature detection circuit 204, thereby protecting the image forming device.

The hardware protection circuit 208 may, but is not limited to, use a full hardware circuit design. For example, it may include a voltage comparison circuit, which compares the received voltage detection signal of the temperature detection circuit 204 with a reference voltage signal. When the voltage detection signal is higher than the reference voltage signal, the switch circuit is immediately controlled to turn off. The reference voltage signal is pre-designed to have a correspondence relationship with the set temperature value.

In the embodiments of FIG. 4, the third reception terminal is shown to be connected to the power circuit 2052. In some other embodiments, the third reception terminal may also be connected to the controller 2051, which will not be described in detail herein.

As for other circuit modules in the embodiments of FIG. 4, such as the mains power interface 201, the thermistor insertion terminal 207, etc., reference may be made to the descriptions of the foregoing embodiments, which will not be described in detail herein.

Figure 5:
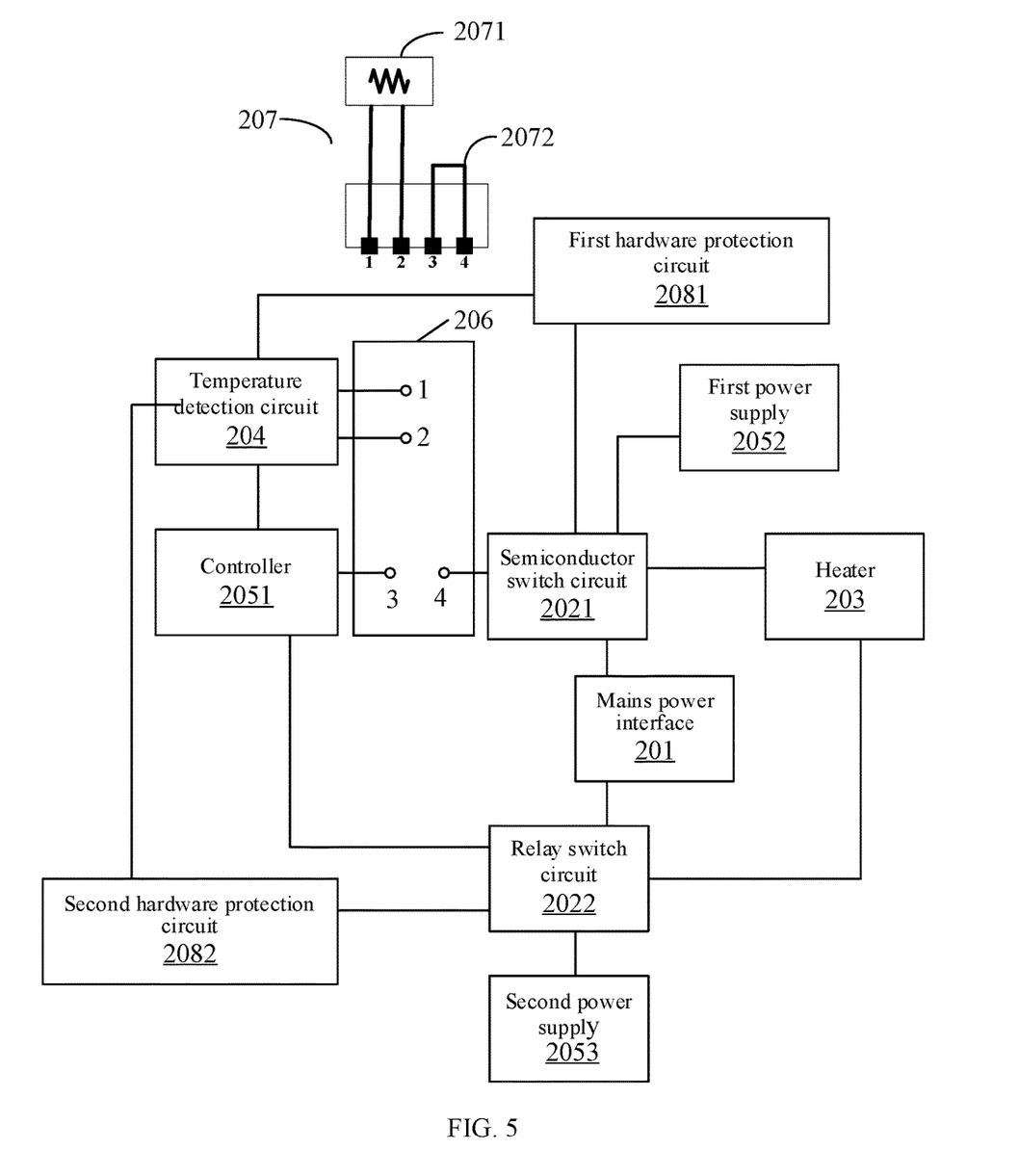
FIG. 5 is a schematic structural diagram of a fixation heating circuit according to another embodiment of the present disclosure.

FIG. 5 shows another fixation heating circuit provided in the embodiments of the present disclosure on the basis of the foregoing embodiments.

In the embodiments of the present disclosure, the switch circuit includes a semiconductor switch circuit 2021 and a relay switch circuit 2022, where the semiconductor switch circuit 2021 may include a thyristor and/or an optocoupler.

The mains power interface 201, the semiconductor switch circuit 2021, the heater 203, and the relay switch circuit 2022 are connected in series with each other to form the heating loop.

In the embodiments of the present disclosure, the switch control circuit includes a controller 2051, a first power supply 2052 (such as +24V) for supplying power to the semiconductor switch circuit 2021, and a second power supply 2053 for supplying power to the relay switch circuit 2022.

The hardware protection circuit includes a first hardware protection circuit 2081 and a second hardware protection circuit 2082. One end of the first hardware protection circuit 2081 is connected to the temperature detection circuit 204 for obtaining the voltage detection signal of temperature, and the other end is connected to the semiconductor switch circuit 2021 for implementing a hardware control mode of turning on or off the semiconductor switch circuit 2021 according to the voltage value. One end of the second hardware protection circuit 2082 is connected to the temperature detection circuit 204, and the other end is connected to the relay switch circuit 2022 for implementing a hardware control mode of the relay switch circuit. In the embodiments of the present disclosure, the first hardware protection circuit 2081 and the second hardware protection circuit 2082 may be two independent hardware protection circuits, or may be the same hardware protection circuit, and both of them may be designed to include the voltage comparison circuit.

In the embodiments of FIG. 5, the third reception terminal and the fourth reception terminal are only schematically drawn between the controller 2051 and the semiconductor switch circuit 2021. In practice, the third reception terminal and the fourth reception terminal may also have many other setup modes. For example, since the semiconductor switch circuit 2021 and the relay switch circuit 2022 are connected in series, the third reception terminal and the fourth reception terminal can also be arranged between the controller 2051 and the relay switch circuit 2022 (i.e., the third reception terminal is connected to the controller 2051, and the fourth reception terminal is connected to the relay switch circuit 2022). In addition, the third reception terminal and the fourth reception terminal can also be arranged between the semiconductor switch circuit and the first power supply, or between the relay switch circuit and the second power supply.

Specific working principle of the fixation heating circuit in the embodiments of FIG. 5 will not be described in detail herein. In short, when the thermistor insertion terminal 207 is inserted into the thermistor reception terminal 206, the first to fourth insertion terminals are electrically connected to the corresponding first to fourth reception terminals, and then the thermistor 2071 is inserted into the temperature detection circuit 204, so that the temperature detection circuit can work effectively. When the third reception terminal and the fourth reception terminal are effectively connected, the controller 2051 can also perform effective software control on the semiconductor switch circuit or the relay switch circuit according to the temperature value, while the first hardware protection circuit and the second hardware protection circuit directly perform hardware control on the semiconductor switch circuit or the relay switch circuit, so that the heating loop can work normally, and at the same time, a power-off protection is performed when heating temperature is too high.

Figure 6:
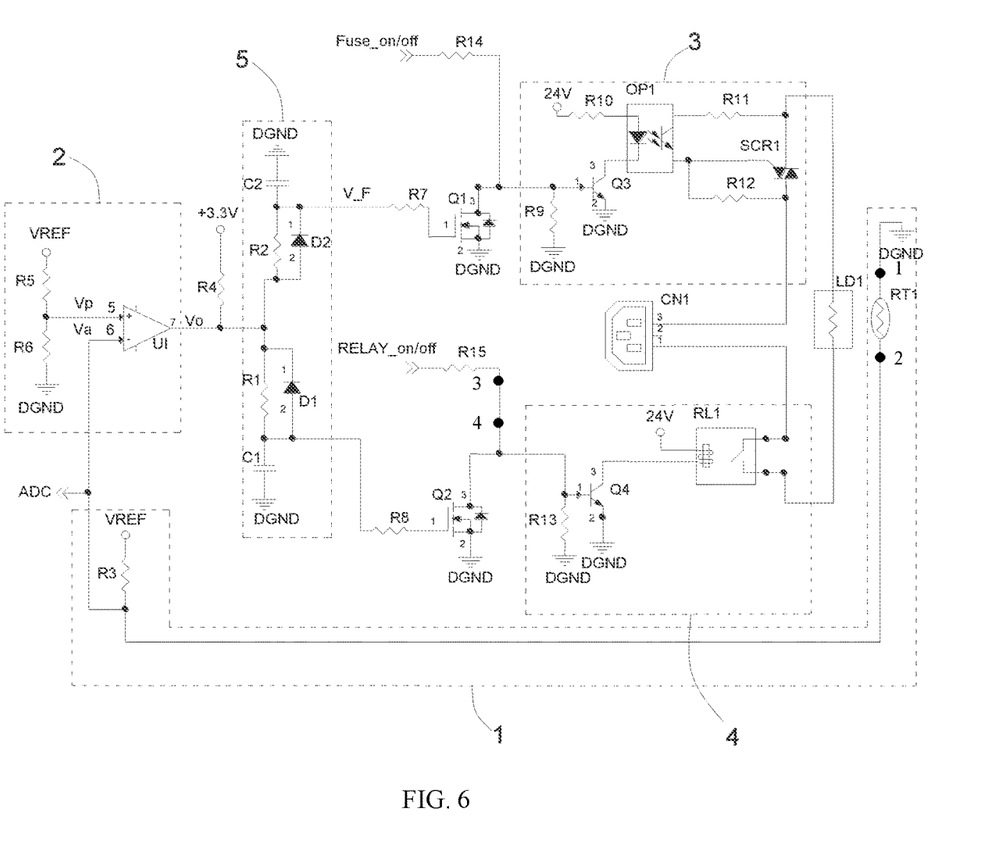
FIG. 6 is a circuit schematic diagram with a thermistor insertion terminal and a thermistor reception terminal being connected according to an embodiment of the present disclosure.

FIG. 6 shows a detailed circuit schematic diagram with the thermistor insertion terminal being connected to the thermistor reception terminal provided in the embodiments of the present disclosure. In FIG. 6, a first reception terminal 1 and a second reception terminal 2 are located at two ends of a thermistor RT1, and a third reception terminal 3 and a fourth reception terminal 4 are located at one end of a resistor R15.

Specifically, in FIG. 6, the circuit includes a heater LD1, a mains power interface CN1, a temperature detection circuit 1, a comparator circuit 2, a semiconductor switch circuit 3, and a relay switch circuit 4. The heater LD1 is configured to heat a fixation roller, and the mains power interface CN1 is configured to supply power to the heater LD1 after being connected to mains power. The temperature detection circuit 1 is configured to detect temperature of the heater LD1 and form a corresponding voltage value Va according to the temperature. Va can also be transmitted to an analog-to-digital conversion (ADC) module of the controller (not shown). An input end of the comparator circuit 2 is connected to the temperature detection circuit 1 for comparing the voltage value Va with a preset reference voltage value Vp and outputting a control signal according to comparison result. The semiconductor switch circuit 3 is connected to the comparator circuit 2 and the heater LD1 respectively, and is configured to control the heater LD1 to be turned on or off according to the control signal output by the comparator circuit 2. The relay switch circuit 4 is connected to the comparator circuit 2 and the heater LD1 respectively, and is configured to control the heater LD1 to be turned on or off according to the control signal output by the comparator circuit 2. That is, in the embodiments of the present disclosure, the semiconductor switch circuit 3 and the relay switch circuit 4 share one hardware protection circuit.

In the embodiments of the present disclosure, a specific control process includes software control of the controller and hardware control of the hardware protection circuit. The controller can control the semiconductor switch circuit to turn on or off through a Fuse_on/off signal according to the temperature value obtained by the ADC, and can also control the relay switch circuit to turn on or off through a RELAY_on/off signal. When the heating temperature of the heater LD1 is within a preset normal range, Va>Vp, and the comparator circuit 2 outputs a low level. The semiconductor switch control circuit 3 and the relay switch circuit 4 are respectively turned on, and current of the heater LD1 is connected, so that the heater LD1 heats normally. If the software input signal Fuse_on/off or RELAY_on/off is invalid, the heater LD1 continues to heat. When the heating temperature of the heater LD1 exceeds the preset normal range, such as when exceeding 220° C., Va<Vp, and output of the comparator circuit 2 jumps from the low level to a high level. The semiconductor switch circuit 3 and the relay switch circuit 4 are respectively turned off, and the current of the heater LD1 is disconnected, so that the heater LD1 stops heating.

The comparator circuit 2 is provided in the present disclosure, so that in case of abnormal software output control, heating of the heater can also be controlled through the control signal output by the comparator circuit 2. That is, the heating of the heater can be controlled by a hardware circuit, so as to avoid the fixation roller being burned out due to overheating. Meanwhile, the semiconductor switch circuit 3 and the relay switch circuit 4 are provided in the present disclosure for controlling the heating of the heater LD1 together. When the semiconductor switch circuit 3 is short-circuited due to an external factor (such as insect entry, thunder, etc.), and the semiconductor switch circuit 3 fails to control the heater LD1, the relay switch circuit 4 can also control the heater LD1 to turn off, so as to prevent the heater LD1 from continuous heating and causing fixation device temperature to be too high.

When the thyristor and the relay are controlled through the same signal, there is problem of the relay being powered off and powered on. If the relay is powered on or powered off, contacts of the relay will be stuck, and the relay will be damaged, which causes a heating failure.

In order to prevent the relay from working with power, the heating device of the present disclosure further includes a relay protection circuit 5, which is connected to the comparator circuit 2, the semiconductor switch circuit 3, and the relay switch circuit 4, respectively. The relay protection circuit 5 is configured to cause the relay switch circuit 4 to delay turn off or turn off in advance compared with the semiconductor switch circuit 3, so as to prevent the relay being powered on or powered off to avoid the contacts of the relay being stuck, and the relay being damaged, which causes the heating failure.

In some other embodiments of the present disclosure, the first hardware protection circuit and the second hardware protection circuit may be provided respectively to implement the hardware control mode for the semiconductor switch circuit and the relay switch circuit. When the thermistor is connected to the circuit, both the first hardware protection circuit and the second hardware protection circuit can work effectively. Similarly, multiple hardware protection circuits can be provided to protect the semiconductor switch circuit and the relay switch circuit, which is not limited in the present disclosure.

In the embodiments of the present disclosure, principle of implementing the over-temperature protection mechanism by combining the software control mode and the hardware control mode will not be described in detail herein, which is similar as shown in FIG. 6.

The fixation heating circuits in the above embodiments of the present disclosure can be applied to the image forming device.

In summary, the fixation heating circuits and the image forming device are provided in the embodiments of the present disclosure. The fixation heating circuit includes the mains power interface, the switch circuit, the heater, the temperature detection circuit, the switch control circuit, the thermistor reception terminal, and the thermistor insertion terminal. The mains power interface, the switch circuit, and the heater are connected to each other to form the heating loop. The thermistor insertion terminal includes first to fourth insertion terminals, where the thermistor is connected between the first insertion terminal and the second insertion terminal, and the third insertion terminal and the fourth insertion terminal are connected via the wire. The thermistor reception terminal includes first to fourth reception terminals, and the first reception terminal and the second reception terminal are arranged in the temperature detection circuit. The temperature detection circuit is connected to the switch control circuit. The switch control circuit is connected to the third reception terminal, and the switch circuit is connected to the fourth reception terminal. In this way, when the thermistor insertion terminal is inserted into the thermistor reception terminal, the thermistor is connected to the temperature detection circuit, and the switch control circuit and the switch circuit are electrically connected, so that the temperature detection circuit can realize normal temperature detection function. The switch control circuit can also realize control function of the switch circuit to be on or off, so as to realize connection or disconnection of the heating loop. When the thermistor insertion terminal is separated from the thermistor reception terminal, there is no thermistor in the temperature detection circuit, so that temperature detection cannot be performed. Also, the switch control circuit and the switch circuit are disconnected, and the switch circuit is off, so that the heating loop cannot work normally. Therefore, compared with the existing technologies, in the technical solution of the present disclosure, it is not needed to set up the thermistor missing detection circuit, which reduces the cost. Also, when the thermistor is missed, the heating loop cannot work, so that safety of electricity consumption can be ensured, and accuracy of detecting whether the thermistor is missed or not is enhanced.

It is intended that the specification and examples be considered as example only and not to limit the present disclosure. Any modification, equivalent replacement, improvement, etc. made within the spirit and principle of the present disclosure shall be within the present disclosure.

What is claimed is:
1. A fixation heating circuit comprising:
a mains power interface;
a switch circuit;
a heater;
a temperature detection circuit;
a switch control circuit;
a thermistor reception terminal; and
a thermistor insertion terminal;
wherein:
the mains power interface, the switch circuit, and the heater are connected to each other to form a heating loop;
the thermistor insertion terminal includes first to fourth insertion terminals, a thermistor being connected between the first insertion terminal and the second insertion terminal, and the third insertion terminal and the fourth insertion terminal being connected via a wire;

the thermistor reception terminal includes first to fourth reception terminals corresponding to the first to the fourth insertion terminals, the first reception terminal and the second reception terminal being arranged in the temperature detection circuit; and the temperature detection circuit is connected to the switch control circuit, the switch control circuit being connected to the third reception terminal, and the switch circuit being connected to the fourth reception terminal, wherein the switch control circuit includes a controller, and the controller is connected to the third reception terminal.

2. The fixation heating circuit according to claim 1, wherein:

the switch control circuit includes a power circuit for supplying power to the switch circuit.

3. The fixation heating circuit according to claim 2, further comprising a hardware protection circuit configured to control the switch circuit to turn off according to a detection signal of the temperature detection circuit when the controller fails;

wherein the hardware protection circuit is connected to the temperature detection circuit, and the hardware protection circuit is connected to the switch circuit.

4. The fixation heating circuit according to claim 2, wherein the switch control circuit includes the controller which performs analog-to-digital conversion on a temperature detection signal, obtains a temperature value corresponding to a voltage signal, and further controls the switch circuit to be on or off according to the temperature value.

5. The fixation heating circuit according to claim 1, wherein:

the switch circuit includes a semiconductor switch circuit and/or a relay switch circuit;

the controller includes a first control terminal configured to output a first control signal to the semiconductor switch circuit, and/or a second control terminal configured to output a second control signal to the relay switch circuit; and the power circuit includes a first power supply configured to supply power to the semiconductor switch circuit, and/or a second power supply configured to supply power to the relay switch circuit.

6. The fixation heating circuit according to claim 5, wherein the first control terminal or the second control terminal is connected to the third reception terminal.

7. The fixation heating circuit according to claim 5, wherein the semiconductor switch circuit includes a thyristor and/or an optocoupler.

8. The fixation heating circuit according to claim 5, wherein the hardware protection circuit includes a first hardware protection circuit connected to the semiconductor switch circuit and/or a second hardware protection circuit connected to the relay switch circuit.

9. The fixation heating circuit according to claim 8, wherein the first hardware protection circuit and the second hardware protection circuit are two independent hardware protection circuits, or a shared hardware protection circuit.

10. The fixation heating circuit according to claim 8, wherein the first hardware protection circuit and/or the second hardware protection circuit includes a voltage comparison circuit.

11. An image forming device comprising:
a fixation heating circuit including:
a mains power interface;
a switch circuit;
a heater;
a temperature detection circuit;
a switch control circuit;
a thermistor reception terminal; and
a thermistor insertion terminal;
wherein:
the mains power interface, the switch circuit, and the heater are connected to each other to form a heating loop;

the thermistor insertion terminal includes first to fourth insertion terminals, a thermistor being connected between the first insertion terminal and the second insertion terminal, and the third insertion terminal and the fourth insertion terminal being connected via a wire;

the thermistor reception terminal includes first to fourth reception terminals corresponding to the first to the fourth insertion terminals, the first reception terminal and the second reception terminal being arranged in the temperature detection circuit; and the temperature detection circuit is connected to the switch control circuit, the switch control circuit being connected to the third reception terminal, and the switch circuit being connected to the fourth reception terminal, wherein the switch control circuit includes a controller, and the controller is connected to the third reception terminal.

12. The image forming device according to claim 11, wherein:

the switch control circuit includes a power circuit for supplying power to the switch circuit.

13. The image forming device according to claim 12, further comprising a hardware protection circuit configured to control the switch circuit to turn off according to a detection signal of the temperature detection circuit when the controller fails;

wherein the hardware protection circuit is connected to the temperature detection circuit, and the hardware protection circuit is connected to the switch circuit.

14. The image forming device according to claim 12, wherein the switch control circuit includes the controller which performs analog-to-digital conversion on a temperature detection signal, obtains a temperature value corresponding to a voltage signal, and further controls the switch circuit to be on or off according to the temperature value.

15. The image forming device according to claim 11, wherein:

the switch circuit includes a semiconductor switch circuit and/or a relay switch circuit;

the controller includes a first control terminal configured to output a first control signal to the semiconductor switch circuit, and/or a second control terminal configured to output a second control signal to the relay switch circuit; and the power circuit includes a first power supply configured to supply power to the semiconductor switch circuit, and/or a second power supply configured to supply power to the relay switch circuit.

16. The image forming device according to claim 15, wherein the first control terminal or the second control terminal is connected to the third reception terminal.

17. The image forming device according to claim 15, wherein the semiconductor switch circuit includes a thyristor and/or an optocoupler.

18. The image forming device according to claim 14, wherein the hardware protection circuit includes a first hardware protection circuit connected to the semiconductor switch circuit and/or a second hardware protection circuit connected to the relay switch circuit.

19. The image forming device according to claim 18, wherein the first hardware protection circuit and the second hardware protection circuit are two independent hardware protection circuits, or a shared hardware protection circuit.

20. The image forming device according to claim 18, wherein the first hardware protection circuit and/or the second hardware protection circuit includes a voltage comparison circuit.

\* \* \* \* \*